United States Patent [19]
Blau et al.

[11] 3,715,075
[45] Feb. 6, 1973

[54] TWO-PART SCREW CLOSURE COVER

[76] Inventors: Werner Blau, 52, Gladbacherstrasse; Theo Gerdes, 24, Lortzingweg, both of Langenfeld, Rhineland, Germany

[22] Filed: June 18, 1971

[21] Appl. No.: 154,409

[30] Foreign Application Priority Data

June 22, 1970 Germany.....................P 20 30 600.7

[52] U.S. Cl. ..................220/39 R, 215/43 R, 215/49
[51] Int. Cl. ...............................B65d 41/04
[58] Field of Search .......220/39 R; 215/43 R, 49, 50, 215/55, 43 R

[56] References Cited

UNITED STATES PATENTS

| | | | |
|---|---|---|---|
| 2,613,012 | 10/1952 | Taylor et al | 220/39 R |
| 3,023,924 | 3/1962 | Boyer | 220/39 R |
| 3,666,137 | 5/1972 | Blau et al | 220/39 R |
| 3,667,642 | 6/1972 | Blau et al | 220/39 R |

*Primary Examiner*—George T. Hall
*Attorney*—Ernest G. Montague

[57] ABSTRACT

A two-part screw closure cover for containers or a pipe or tube socket, comprising coupling members in mutual engagement for connecting purposes and having a ratchet-like action, for automatic disengagement upon reaching a predetermined tightening torque of the cover, in which the coupling members are outwardly supported between both mutually freely rotatably mounted cover parts and are mounted in the inner circumference of one part of the cover, which coupling parts, which are provided with groove-like recesses, co-operate, in a radial direction, with a coupling means engaging with a ratchet-like action in the other part of the cover and, when a predetermined tightening torque for the screw cover part is reached, automatically disengage therefrom.

5 Claims, 4 Drawing Figures

TWO-PART SCREW CLOSURE COVER

PRIOR APPLICATION

In Federal Republic of Germany on 22nd June 1970 and numbered P 20 30 600.7

The present invention concerns a cover for screw connections and consists of two parts, for containers or as pipe or tube socket closures having coupling members provided with a ratchet-like action which are inserted between the parts of the cover, in which said coupling members, upon reaching a suitably determined cover tightening torque, automatically disengage as a result of the forces issuing from the pressure of the threads.

Screw thread covers suffer from the disadvantage that, due to being excessively tightened on their threaded socket, they can only be released to open the container with difficulty, that is to say, such covers frequently can only be unscrewed by hand with considerable physical force or can be only released with the use of mechanical means, particularly if the threaded portions are heavily soiled.

Accordingly, it is necessary to form such covers so that they can be tightened only up to a predetermined tightening torque in order that they may be easily unscrewed again. For this purpose, it is known to provide an upper cap portion comprising a lower actual threaded cover portion inserted to rotate freely therein, and to insert there-between coupling members serving for such connection, in the form of spring elements having a predetermined pressure force which, when a corresponding cover tightening torque in the closing direction is reached, automatically disengage in a ratchet-like manner so that the upper rotary cover member is still freely rotatable. Since the coupling members below the upper part of the cover engage over each other in a ratchet-like manner, the lower threaded cover portion does not rotate jointly therewith, that is to say, it cannot be tightened any more. Accordingly, in the opposite direction of rotation, the threaded cover portion is jointly rotated by the engagement of the parts in the reversed position and can easily be opened again at any time, since the cover cannot be excessively tightened. Spring elements, aligned obliquely upwardly in the closing direction of the cover, always engage in a gripping or handle portion pressed out of the upper part of the rotary closure, or an inserted disc member, provided with cams or helical gearing, also engages in the axial direction of the cover, aligned upwardly or downwardly, with the effect of spring pressure, in corresponding recesses in the other part of the cover. Hence, when a predetermined cover tightening torque is reached, automatic disengagement of the inserted disc member occurs, in the manner of a ratchet so that mutual engagement of both cover parts over each other is effected by means of interposed spring elements, and the upper rotary closure member is still freely rotatable, and the tightened lower threaded part cannot be tightened any more on a threaded socket and can easily be released again in the opposite direction of rotation.

It is an object of the present invention to provide a simplified form for such two-part closure covers comprising an upper screw cover part and a lower threaded screw cover part and having interposed spring coupling members with a ratchet action, and at the same time, to provide a more suitable coupling form for both cover parts with each other in order to ensure mutual coupling, on the one hand, and automatic disengagement on the other hand, in a technically practical manner.

According to the present invention there is provided a two-part screw closure cover for containers or a pipe or tube socket, comprising coupling members in mutual engagement for connecting purposes and having a ratchet-like action, for automatic disengagement upon reaching a pre-determined tightening torque of the cover, in which the coupling members are outwardly supported between both mutually freely rotatably mounted cover parts and are mounted in the inner circumference of one part of the cover, which coupling parts, which are provided with groove-like recesses, cooperate, in a radial direction, with coupling means engaging with a ratchet-like action in the other part of the cover and, when a pre-determined tightening torque for the screw cover part is reached, automatically disengage therefrom.

The present invention will be further illustrated by way of example, with reference to the accompanying drawings in which.

Figure 1:
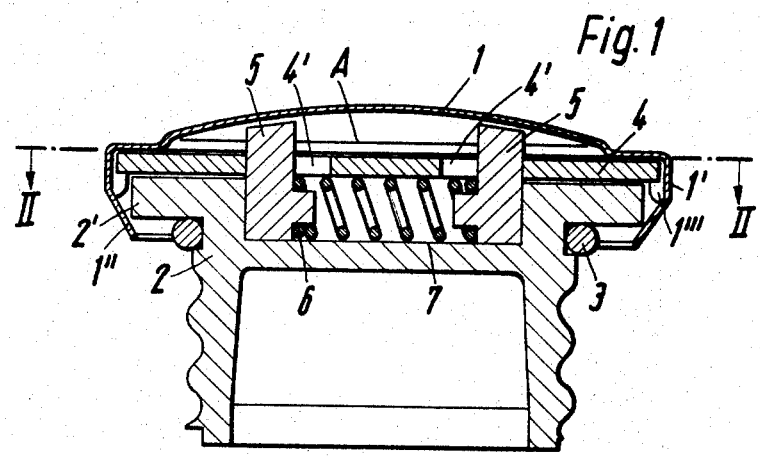
FIG. 1 is a section through a screw closure cover having coupling members inserted therein in disc form or as bridge members in accordance with one embodiment of the present invention.
Figure 2:
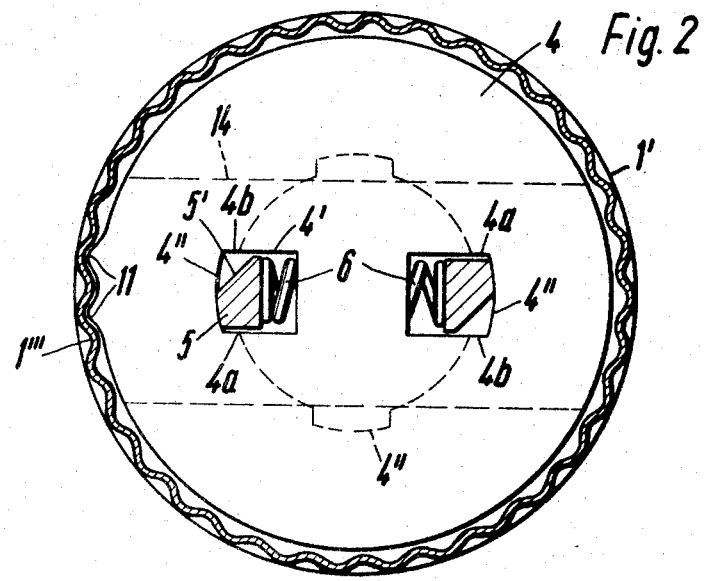
FIG. 2 is a section taken on the line II—II of FIG. 1.

As illustrated in FIGS. 1 and 2, an upper screw cover part 1 engages over the lower screw cover part 2 by means of an externally downwardly drawn edge portion 1'. The upper flanged edge 2' of the lower screw cover part 2 is supported by the downwardly flanged cap edge portion 1'' of the upper screw cover part 1. In the normal manner, an annular disc seal is inserted below the flanged edge 2' of the lower screw cover part 2, which seal presses against the container edge or pipe or tube socket edge to be sealed.

As illustrated, a sealing ring 3 is inserted in an annular groove below the flanged edge 2' of the lower screw cover part 2, which ring is simultaneously pressed against and to a degree over the edge of the container or socket, or alternatively the ring may be simultaneously pressed between the flanged edge 2' and the lower screw cover part 2.

A separate coupling disc 4, which acts to couple the cover parts 1 and 2 together, is mounted between the freely rotatable upper screw cover part 1 and its associated edge portions 1' and 1'', and the freely rotatable lower screw cover part 2 and its associated edge portion 2', and over the inner circumference of the upper screw cap 1 and its associated edge portion 1'. For this purpose the coupling disc 4 is provided with projections 11 which are distributed over its outer circumference and engage with a co-operably engaging corrugated edge portion 1''' provided in the externally downwardly drawn edge portion 1' of the lower screw cover part 1, thereby supporting the disc 4. Alternatively, the disc 4 may be replaced diametrically opposed by a bridge member 14, shown in broken lines, which member 14 is prevented from rotating by means of projections 11 which engage with the corrugated edge portion 1'''.

Furthermore, according to the present invention, coupling members 5 are provided which extend upwardly through recesses 4' provided in the coupling disc 4. The members 5 are pressed diametrically oppositely and radially outwardly by means of an interposed compression spring 6.

The members 5 are disposed in grooves located in a depression 7 provided in the lower screw cover part 2 and act as driving members. The members 5 may alternatively engage in groove-like recesses 4'' provided in the coupling means, viz. disc 4 or bridge member 14, by means of spring pressure. When the upper screw cover part 1, including its associated edge portion 1' is turned, the coupling members 5, being disposed within its inner circumference are engaged by the coupling means viz. disc 4 or bridge member 14, whereby the lower screw cover part 2, including its associated edge portion 2', is accordingly turned simultaneously.

When the upper screw cover part 1 is turned to its closed position on a container or pipe or tube socket, the lower screw cover part 2 is correspondingly turned in a clockwise direction by means of the above-described coupling arrangement, and is thereby tightened on the threaded socket by means of the sealing ring 3. Meanwhile, the coupling members 5 are each engaged, by means of the spring means 6, within the groove-like recesses 4'' provided in the coupling means 4 or 14 by being disposed against the parallel edge 4a of the grooves. If, as a result of tightening the closure, a force occurs which exceeds the predetermined torque for the lid, then the upper screw cover part 1, including its associated edge portion 1', together with the coupling means 4 or 14, will continue to turn. As the coupling members 5 are driven by the coupling means 4 or 14, then in the closing direction of the cover, the bevelled surfaces 5' of the members 5 run against the other edges 4b (opposite to 4a) of the grooves 4''. Upon overcoming the correspondingly predetermined force applied by the spring means 6, the coupling members 5 are released from engagement with the recessed grooves 4'' so that, as the now freely running upper screw cover part 1 continues to turn, the coupling members 5 engage above the recessed grooves 4'' in the coupling means 4 or 14 in the manner of a ratchet. Thus, however, as the screw closure cover, depending on the calculated force of the particular spring 6 used, can only be tightened up to a predetermined force, then upon reaching such tightening force, the coupling between the upper screw cover part 1, including its associated edge portion 1', and the lower screw cover part 2 including its associated edge portion 2' disengages automatically by way of means 4 or 14 or members 5 by the reaction of the correspondingly prevailing thread pressure.

In order to open the closure cover by rotation in the opposite direction, however, the coupling members 5, automatically engage being guided by the compression spring 6, against the groove edges 4a so as to drive the lower part 2 of the threaded cover in an anticlockwise direction in order to release the mutually tightened thread convolutions. Since the predetermined screw closure cover cannot, in any case, be excessively tightened, it can be easily loosened or turned back at any time, the ends of the coupling members 5 extending upwardly into the part 1 can also be turned, by contact with the edge "A" of the cover, until they engage in grooves 4'' provided over the circumference of the coupling disc 4.

Figure 3:
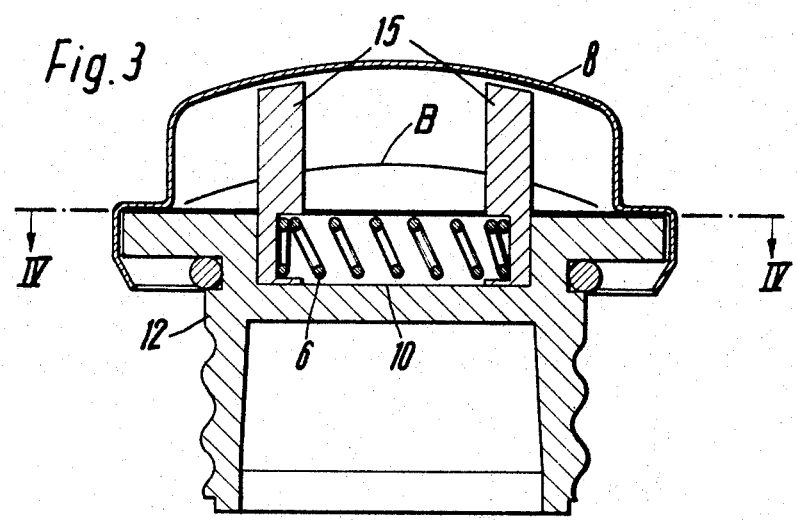
FIG. 3 is a section through a screw closure cover having a modified form of coupling arrangement in accordance with a further embodiment of the present invention.
Figure 4:
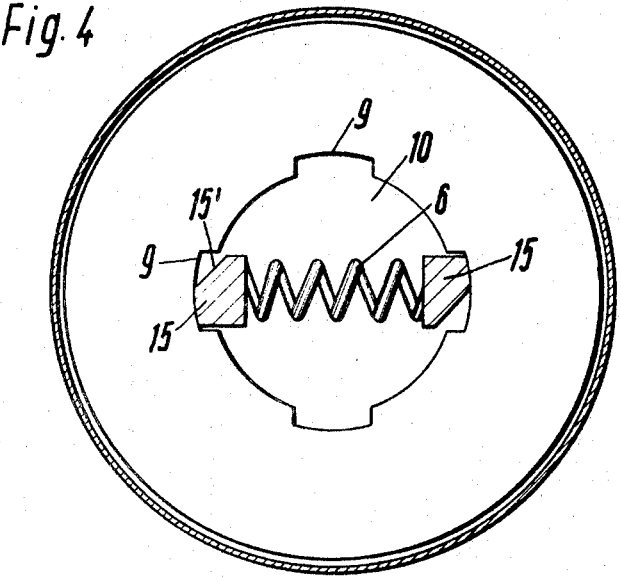
FIG. 4 is a section taken on the line IV—IV of FIG. 3.

FIGS. 3 and 4 illustrate a modified and simplified embodiment of the present invention, in which coupling members 15 extend upwardly into a gripping portion or handle 8 which is diametrically pressed out of the upper part of the cover or engage downwardly directly into grooves 9 provided on the circumference within a member 10 or, in turn, are pressed diametrically outwardly by a compression spring 6 within this member 10 into the grooves 9. When the upper part of the cover is turned, by means of the gripping member or handle 8 the lower portion 12 of the threaded cover is engaged by contact with the edge "B" by means of the coupling members 15 and, in turn, is screwed against a threaded socket until a pre-determined tightening torque is reached and until a reaction force, resulting from the pressure of the thread, overcomes the force of the compression spring 6. The coupling members 15 thereafter disengage from their engagement with the grooves 9 against the force of the compression spring, whilst the inclined surfaces 15' of the coupling members engage, with a ratchet-like action, over the outer edges of the grooves 9 or, the edges of the coupling members 15 which are not inclined, are in contact with the opposite edges of the grooves 9, said members 15 being guided in parallel, in the reverse direction of rotation for releasing the cover, whereby the lower portion 12 of the threaded cover may once again be unscrewed from its sealing seat.

We claim:

1. A two-part screw closure cover comprising coupling members in mutual engagement for connecting purposes and having a ratchet-like action, for automatic disengagement upon reaching a predetermined tightening torque of the cover, in which the coupling members are outwardly supported between both mutually freely rotatably mounted cover parts and are mounted in the inner circumference of one part of the cover, which coupling parts, which are provided with groove-like recesses, co-operate, in a radial direction, with coupling means engaging with a ratchet-like action in the other part of the cover and, when a predetermined tightening torque for the screw cover part is reached, automatically disengage therefrom.

2. A screw closure cover as recited in claim 1, in which a disc is used as coupling means having a central aperture and, over its circumference, radially outwardly directed recesses for groove-like engagement of diametrically opposing coupling members under the force of a compression spring on the circumference of the upper part of the screw closure.

3. A screw closure cover as recited in claim 1, in which a bridge member is used as coupling means which is inserted diametrically oppositely in the upper part of the screw closure and engages radially outwardly in grooves under the force of a compression spring co-operating with coupling members extending through apertures and engaging on the lower part of the screw cover.

4. A screw closure cover as recited in claim 1, in which the coupling means is prevented from twisting by engagement with projections extending from the outer circumference of an edge of the cover.

5. A screw closure cover as recited in claim 1, in which, within a recess having grooves directed outwardly and distributed over the periphery of the coupling means and directly formed in the upper flanged portion of the screw cover member, coupling members subjected to radial spring pressure, engage by their parts in a diametrically pressed-out gripping member or handle projecting upwardly in an axial direction relative to the screw closure.

* * * * *